Oct. 6, 1931.    O. C. BLAKESLEE    1,826,045
DUPLEX GRIP TOOL
Filed Sept. 30, 1929
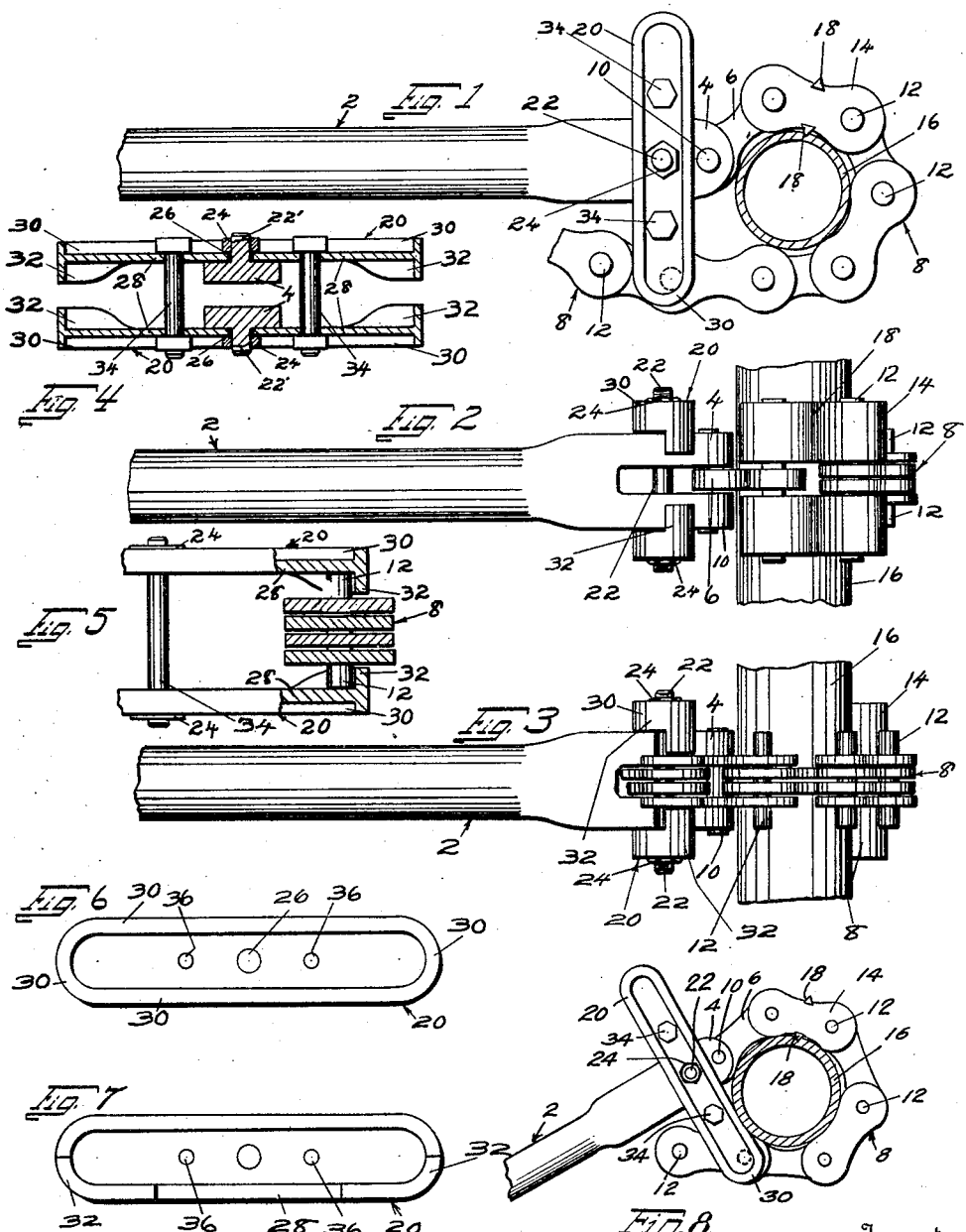

Patented Oct. 6, 1931

1,826,045

UNITED STATES PATENT OFFICE

ORRIN C. BLAKESLEE, OF COMPTON, CALIFORNIA

DUPLEX GRIP TOOL

Application filed September 30, 1929. Serial No. 396,060.

My invention relates to improvements in chain tongs, and more particularly in those tongs which are adapted for special use in connection with pipes, such, for example, as those used in oil well practice, although in its broader aspects is not to be limited in use to said pipes.

It accordingly is an object of my invention to provide a novel form of duplex tongs in which an operating member, in the form of a lever or handle, has associated therewith a chain adapted to grip the work, at least one of the links of said chain functioning as an anchoring means, said link, on opposite edges thereof, being provided with a tooth or biting key, and preferably removable from said link, so said keys may be replaced when worn, a swinging arm, of duplex form being also provided, and preferably pivoted at its midpoint to said operating member.

The above and further objects and advantages of my invention, as will hereinafter more fully appear, I attain by the construction described in the specification, and illustrated on the drawings, forming a part of my application.

Reference is had to the accompanying drawings, in which similar reference characters denote similar parts. In the drawings, Fig. 1 is a top plan view of the tongs partly gripping a pipe, shown in section, Fig. 2 is a side elevational view of Fig. 1, Fig. 3 is a view similar to Fig. 2 but taken on the opposite side of Fig. 1, Fig. 4 is a sectional detail view of the twin chain guide and lock devices, but showing a slightly modified mounting on the operating member or lever, Fig. 5 is a somewhat enlarged, fragmentary detail sectional view, illustrating the chain link guiding and locking means associated with the chain guiding and locking member, Fig. 6 is a top plan view of one of the channeled twin elements of the chain guiding and locking member, Fig. 7 is a bottom plan view of Fig. 6, and Fig. 8 is a view similar to Fig. 1, but showing all of the parts of the tongs in engagement with the pipe so the latter may be turned.

Describing my invention more in detail, in its broader aspects said invention comprises an operating member, handle or lever, having associated therewith a chain adapted to embrace and grip the work, said chain having an anchoring means, forming one of the links of said chain, adapted to hold the work, said chain also having a link, which link at all times during the operation of said invention, will hold said operating member away from the work, a duplex swinging arm, and preferably pivoted at its mid-point to said operating member, being provided to function as a chain guiding and locking means.

More particularly, my invention comprises an operating member, handle or lever 2, preferably bifurcated as at 4 to receive the end link 6 of the chain 8, which is pivoted thereto by the pivot pin or bolt 10, the various links of said chain being pivoted together by the pins 12.

One of the links 14 of the chain 8 comprises an anchoring link and is of substantial thickness relative to the remaining links of said chain, said anchoring link functioning as an anchoring jaw to engage the pipe or device 16 to be embraced or clasped, one of the links, such as the link 6, being adapted at all times holding the bifurcated end portion of the operating member 2 away from said pipe or device so that the latter will not be damaged when the tongs are used, and on each side of said anchoring link (Fig. 1) is preferably detachably positioned an anchoring tooth or biting key 18, so as to engage the pipe no matter which way the chain 8 is swung, forming a quick and easy manner of operating the tongs.

Mounted on the operative end of the operating member 2 is a swinging arm, preferably pivoted at its mid-point to said member, designated generally by the numeral 20, which may be pivoted to said member by any preferred means, such as the throughbolt 22 (Figs. 1, 2 and 3) or the threaded projections 22' on the bifurcated end portion 4 (Fig. 4), suitable nuts 24 being used to secure said devices in place on said member, said bolts or projections being adapted to be passed through holes 26.

The device 20 comprises a pair of twin channel elements 28 each having stiffening flanges 30 on one side thereof, and on the other arcuate wedge projections 32, between which and the coacting devices 34, which may be suitable bolts passing through openings 36 in the elements 28, the chain 8 is adapted to be guided and locked. (See especially Fig. 5.)

In operation, the chain 8 is swung in either direction about the pipe 16, the parts initially assuming the position depicted in Fig. 1, the tooth or key 18 engaging said pipe, and the link 6 holding the end portion 4 away so no damage will be done to said pipe.

The chain is now pulled forwardly, causing the pintles 12 of the links 8 to engage the projections 30 of the swinging arm 20, which moves said member 20 toward the pipe 16 until it engages said pipe, the parts assuming the position shown in Fig. 8, the particular chain pintle 12, after said chain has been drawn taut, engaging the upper and lower portions 32, and being locked therein, as seen in Fig. 5. This provides a very effective circumferential grip on the pipe 16, movement of the hand lever 2 causing the parts to tighten said grip as said lever is moved. A reverse movement of the lever 2 permits the removal of the chain 8. The simplicity, effectiveness and ease of operation of the tongs should be clear.

While I have thus described my invention with great particularity, it will be clear that the same may be modified throughout a wide range. I accordingly do not propose to be limited to the exact details of construction or method of application shown and described, but reserve the right in practice to make any and all modifications thereof that fall within the scope of the appended claims.

I claim as my invention:

1. A duplex tool comprising an operating member, a link chain connected to said member, one of said links being of substantially greater thickness than the others, removable and replaceable means on both edges of said link for holding the work, and a swinging arm, pivoted at its mid-point to said member, and providing means to lock said chain and to engage and guide said chain to locking position on both sides of said arm.

2. A duplex tool comprising an operating lever, a link chain connected to said lever, one of said links being adapted at all times to hold said lever away from the work, a biting key on each edge of another of said links for holding the work, and a swinging arm associated with said lever, and providing means to lock said chain and to engage and guide said chain to locking positions on either side of said arm.

3. A chain tongs comprising an operating member, a chain connected to said member, a grip link associated with said chain, and a swinging arm providing means to lock the chain and to engage the chain to locking position, associated with said member, said means comprising a pair of elongated twin channel elements, and means on the inner portions of each of said elements adapted to coact to guide and lock said chain.

4. A chain tongs comprising an operating member, a chain associated with said member, a grip link associated with said chain, and a swinging arm providing means to lock the chain and to engage and guide the chain to locking position associated with said member, said means comprising a pair of twin elements pivoted to said member, stiffening flanges on each of said elements, and arcuate projections on the inner side of said elements, said arcuate projections being adapted to coact with said means to lock said chain.

In testimony whereof I have signed my name to this specification.

ORRIN C. BLAKESLEE.